(12) United States Patent
Choi et al.

(10) Patent No.: US 12,065,074 B2
(45) Date of Patent: Aug. 20, 2024

(54) APPARATUS AND METHOD FOR DISPLAYING VEHICLE INFORMATION

(71) Applicant: HYUNDAI MOBIS CO., LTD., Seoul (KR)

(72) Inventors: Myung Bin Choi, Seoul (KR); Sung Joon Ahn, Seongnam-si (KR); Tae Hun Kim, Seongnam-si (KR); Kyung Hoon Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 371 days.

(21) Appl. No.: 17/487,153

(22) Filed: Sep. 28, 2021

(65) Prior Publication Data
US 2022/0097524 A1 Mar. 31, 2022

(30) Foreign Application Priority Data
Sep. 28, 2020 (KR) .................. 10-2020-0126296

(51) Int. Cl.
*B60Q 1/54* (2006.01)
*B60K 35/00* (2024.01)
(Continued)

(52) U.S. Cl.
CPC .............. *B60Q 1/54* (2013.01); *B60K 35/00* (2013.01); *B60K 35/60* (2024.01); *B60Q 1/38* (2013.01); *B60Q 1/50* (2013.01); *B60Q 1/5037* (2022.05); *B60Q 1/507* (2022.05); *B60Q 1/508* (2022.05); *B60Q 1/525* (2013.01); *B60Q 1/543* (2022.05); *B60Q 1/547* (2022.05);
(Continued)

(58) Field of Classification Search
CPC ........ B60Q 1/54; B60Q 1/507; B60Q 1/5037; B60Q 1/547; B60Q 1/508; B60Q 1/543; B60Q 1/38; B60Q 1/50; B60Q 1/525; B60Q 2400/50; B60K 35/00; B60K 37/02; B60K 2370/1529; B60K 2370/167; B60K 2370/175; B60K 2370/178; B60K 2370/182; B60K 2370/27; B60K 2370/172; B60K 2370/1868; B60K 2370/785; G02B 27/0101; G02B 2027/0138; G02B 2027/0141; G08G 1/22
See application file for complete search history.

(56) References Cited

U.S. PATENT DOCUMENTS 10,235,122 B1 * 3/2019 Goel ................. G06F 3/1423
10,789,851 B1 * 9/2020 Sim .................. G08G 1/165
(Continued)

*Primary Examiner* — Jaime Figueroa
*Assistant Examiner* — Mohamad O El Sayah
(74) *Attorney, Agent, or Firm* — Novo TechIP International PLLC

(57) ABSTRACT

Provided are an apparatus and method for selectively selecting and controlling interior and exterior displays of a vehicle. The apparatus includes an input unit configured to receive driving environment information, a memory configured to store a program for controlling interior and exterior displays of a vehicle according to a driving environment, and a processor configured to execute the program. The processor controls at least one of the interior and exterior displays to selectively project display information in consideration of the driving environment information by transmitting a control command signal for the at least one of the interior and exterior displays.

13 Claims, 15 Drawing Sheets

(51) Int. Cl.
*B60K 35/23* (2024.01)
*B60K 35/28* (2024.01)
*B60K 35/29* (2024.01)
*B60K 35/60* (2024.01)
*B60Q 1/38* (2006.01)
*B60Q 1/50* (2006.01)
*G02B 27/01* (2006.01)
*G08G 1/00* (2006.01)

(52) U.S. Cl.
CPC ........... *G02B 27/0101* (2013.01); *G08G 1/22* (2013.01); *B60K 35/23* (2024.01); *B60K 35/28* (2024.01); *B60K 35/29* (2024.01); *B60K 2360/167* (2024.01); *B60K 2360/172* (2024.01); *B60K 2360/175* (2024.01); *B60K 2360/178* (2024.01); *B60K 2360/182* (2024.01); *B60K 2360/1868* (2024.01); *B60K 2360/27* (2024.01); *B60K 2360/785* (2024.01); *B60Q 2400/50* (2013.01); *G02B 2027/0138* (2013.01); *G02B 2027/0141* (2013.01)

(56) References Cited

U.S. PATENT DOCUMENTS

| | | | |
|---|---|---|---|
| 2008/0231934 A1* | 9/2008 | Knafou | B60J 3/04 |
| | | | 359/290 |
| 2018/0264940 A1* | 9/2018 | Torii | B60Q 1/5035 |
| 2019/0188494 A1* | 6/2019 | Sawa | F21S 43/00 |
| 2019/0235635 A1* | 8/2019 | Hillis | B60Q 1/26 |
| 2019/0266644 A1* | 8/2019 | Cho | H04W 4/44 |
| 2020/0207262 A1* | 7/2020 | Iwaki | B60Q 1/302 |
| 2020/0369291 A1* | 11/2020 | Daniel | B60W 50/14 |
| 2021/0188159 A1* | 6/2021 | Fukutaka | B60Q 1/46 |
| 2021/0206316 A1* | 7/2021 | Mochizuki | B60Q 1/50 |
| 2021/0394793 A1* | 12/2021 | Austin | B60Q 1/5037 |
| 2022/0066723 A1* | 3/2022 | Lottes | G06Q 10/02 |
| 2023/0242139 A1* | 8/2023 | Siutkowski | B60Q 1/507 |
| | | | 701/23 |

* cited by examiner

FIG. 3
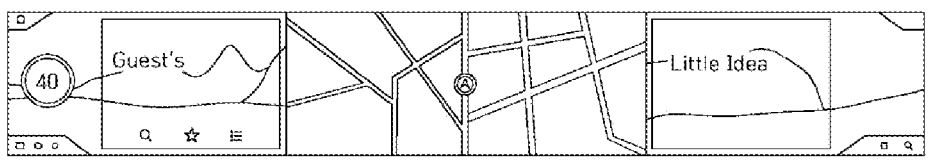
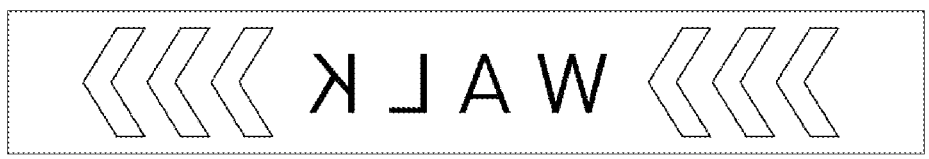

FIG. 4
INTERNAL DISPLAY
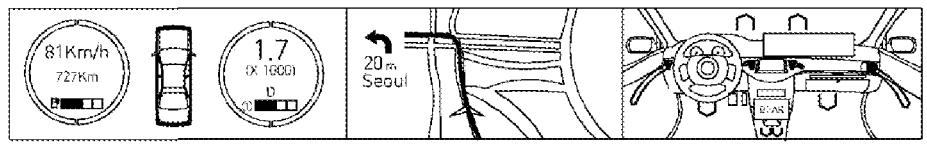
EXTERNAL DISPLAY

INTERNAL DISPLAY

CHOI to Gangnam sta

FIG. 6
EXTERNAL DISPLAY OF FIRST VEHICLE OF VEHICLE PLATOON
| 1st   Platooning 7 Vehicles |
INTERNAL DISPLAY OF THIRD VEHICLE OF VEHICLE PLATOON
3rd 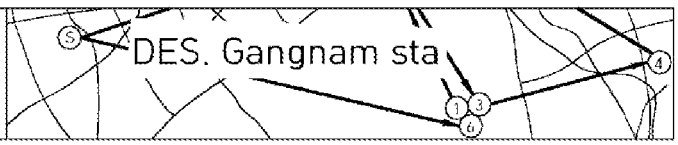
EVENT : THIRD VEHICLE DEVIATES FROM VEHICLE PLATOONING ↓
EXTERNAL DISPLAY OF FIRST VEHICLE OF VEHICLE PLATOON
| 1st   Platooning 6 Vehicles |
INTERNAL DISPLAY OF THIRD VEHICLE DEVIATING FROM VEHICLE PLATOONING
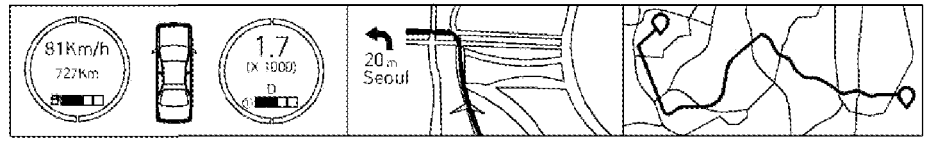

FIG. 8
INTERNAL DISPLAY
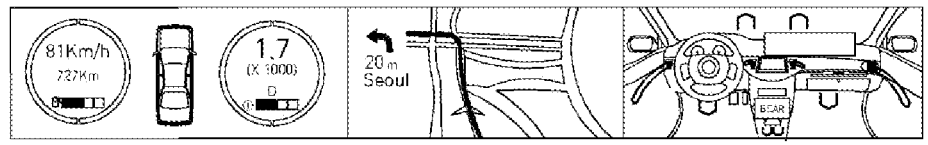
EVENT : GO THROUGH TUNNEL
EXTERNAL DISPLAY (BLINK DIRECTION INDICATOR
AFTER GOING THROUGH TUNNEL)
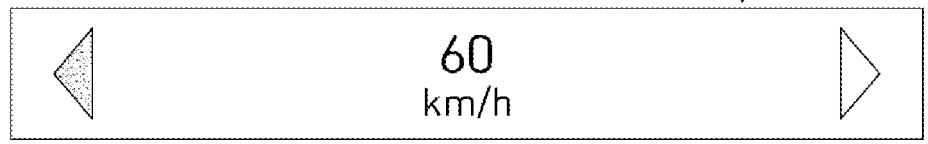

FIG. 9
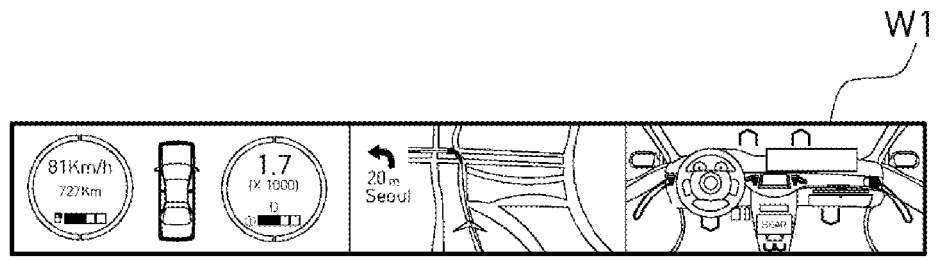
INTERNAL SCREEN
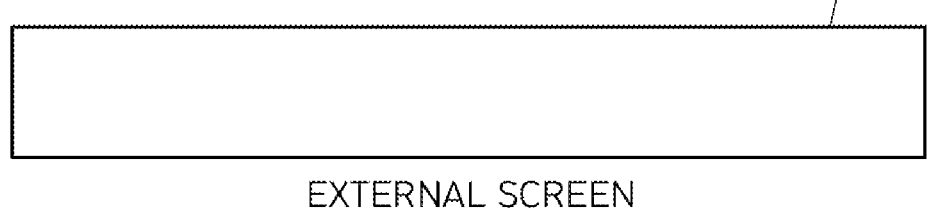
EXTERNAL SCREEN
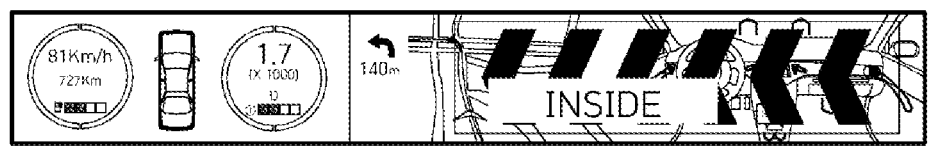
INTERNAL SCREEN
EXTERNAL SCREEN FIG. 12
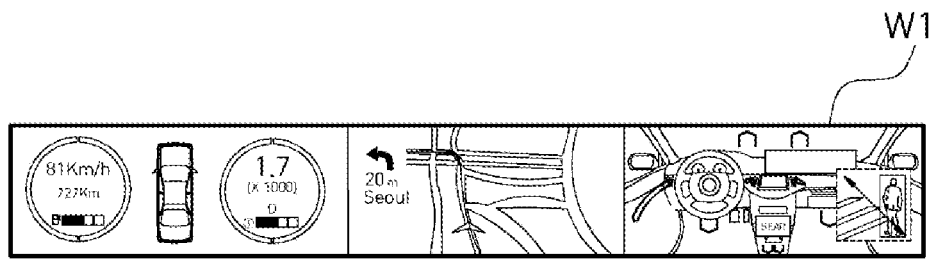
OR
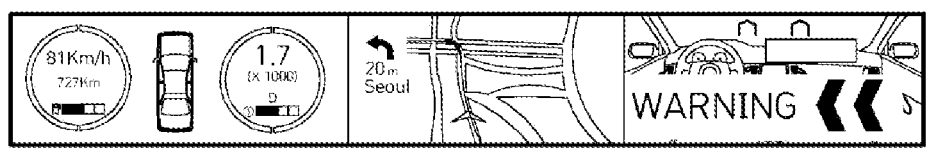
INTERNAL SCREEN
EXTERNAL SCREEN
(VIEWPOINT INSIDE VEHICLE)
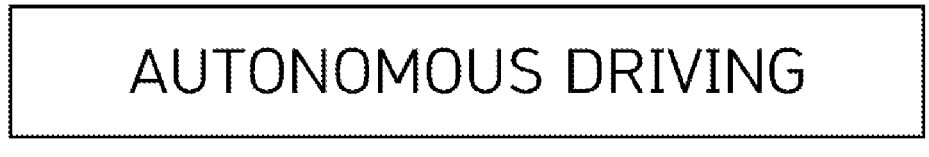
EXTERNAL SCREEN
(VIEWPOINT OUTSIDE VEHICLE)

APPARATUS AND METHOD FOR DISPLAYING VEHICLE INFORMATION

CROSS-REFERENCE TO RELATED APPLICATIONS

This application claims priority to and the benefit of Korean Patent Application No. 10-2020-0126296, filed on Sep. 28, 2020, the disclosure of which is incorporated herein by reference in its entirety.

BACKGROUND OF THE INVENTION

1. Field of the Invention

The present invention relates to an apparatus and method for displaying vehicle information.

2. Discussion of Related Art

Pedestrians recognize surrounding vehicles through their eyes, engine noise made by traveling vehicles, or the like.

Since electric vehicles don't make engine noise, a virtual engine sound system (VESS) which forcibly generates noise to the outside of an electric vehicle is used in order to notify people of the approach thereof.

As a method of preventing a collision between a vehicle and a pedestrian, a horn is generally used in order to notify people of the approach of a vehicle. However, when a driver honks a horn, pedestrians may be startled. Accordingly, a more efficient method is required to support safe driving.

In addition, a vehicle information display device according to the related art has fixed interior and exterior display areas, and thus it is possible to display only determined information.

BRIEF SUMMARY OF THE INVENTION

The present invention is directed to providing an apparatus and method for displaying various information, using one or both of interior and exterior displays through a short-focus projector and change information displayed on the interior and exterior displays according to circumstances.

The present invention is directed to providing an apparatus and method for displaying vehicle information which may control and manage display information provided to a passenger in a vehicle and display information provided to pedestrians outside the vehicle according to a driving environment, the apparatus and method enabling a driver to readily recognize the presence of pedestrians and obstacles and avoid collision and enabling nearby pedestrians to intuitively recognize movement of the vehicle and avoid collision by providing appropriate information for each driving situation in an area easily checkable from a front view (e.g., when the vehicle provides the intention "You can cross" through a display at a crosswalk without crosswalk traffic lights) so that driving safety can be improved.

According to an aspect of the present invention, there is provided an apparatus for displaying vehicle information, the apparatus including an input unit configured to receive driving environment information, a memory configured to store a program for controlling an interior display and an exterior display of a vehicle according to a driving environment, and a processor configured to execute the program. The processor controls at least one of the interior and exterior displays to selectively project display information in consideration of the driving environment information by transmitting a control command signal for the at least one of the interior and exterior displays.

The processor may control both the interior display and the exterior display of the vehicle to be used through a short-focus projector and a windshield equipped with a variable transmission film.

The processor may determine whether to use the interior display or the exterior display of the vehicle using the driving environment information.

The processor may control the interior display to display driving-related information in a manual driving mode and control the exterior display to display communication information for another vehicle or a pedestrian in an autonomous driving mode by using driving mode information.

The processor may control the exterior display to display information extracted from reservation information in consideration of security before a user gets in the vehicle and control the interior display to display driving-related information after the user gets in the vehicle by using the reservation information and boarding information of a shared car.

The processor may control an exterior display of a leading vehicle of a vehicle platoon to display information related to vehicle platooning and control interior displays of other vehicles to display at least one of destination information and entertainment information by using vehicle platooning situation information.

When a vehicle deviates from the vehicle platooning, the processor may control the exterior display of the leading vehicle of the vehicle platoon to display changed information related to the vehicle platooning and control an interior display of the deviating vehicle to display driving-related information.

The processor may control the interior display to display an image of entering a school zone and speed limit information when the vehicle enters a school zone and may control the exterior display to display a crossing-related guide message when a child who tries to cross is detected in a travel direction of the vehicle.

When the vehicle enters and then exits a tunnel, the processor may control the exterior display to display travel speed information or speed limit information and turn indicator information.

According to another aspect of the present invention, there is provided a method of displaying vehicle information, the method including (a) recognizing a driving environment and (b) determining whether to display screens inside and outside a vehicle according to a result of recognizing the driving environment and performing display control.

Operation (b) may include projecting selected display information using a short-focus projector and a windshield to which a variable transmission film is applied.

Operation (b) may include controlling an interior display to display driving-related information in a manual driving mode and controlling an exterior display to display communication information for another vehicle or a pedestrian in an autonomous driving mode by using driving mode information.

Operation (b) may include controlling an exterior display to display information extracted from reservation information in consideration of security before a user gets in the vehicle and controlling an interior display to display driving-related information after the user gets in the vehicle by using the reservation information and boarding information of a shared car.

Operation (b) may include controlling an exterior display of a leading vehicle of a vehicle platoon to display information related to vehicle platooning and controlling interior displays of other vehicles to display at least one of destination information and entertainment information by using vehicle platooning situation information.

Operation (b) may include, when a vehicle deviates from the vehicle platooning, controlling the exterior display of the leading vehicle of the vehicle platoon to display changed information related to the vehicle platooning and controlling the interior display of the deviating vehicle to display driving-related information.

Operation (b) may include controlling the interior display to display an image of entering a school zone and speed limit information when the vehicle enters a school zone and controlling the exterior display to display a crossing-related guide message when a child who tries to cross is detected in a travel direction of the vehicle.

Operation (b) may include, when the vehicle enters and then exits a tunnel, controlling an exterior display to display travel speed information or speed limit information and turn indicator information.

According to another aspect of the present invention, there is provided an apparatus for displaying display information according to a driving environment, the apparatus including an input unit configured to receive driving environment information, a memory configured to store a program for controlling displays inside and outside a vehicle according to a driving environment, and a processor configured to execute the program. The processor controls display information according to the driving environment information to be selectively projected onto an interior screen area and an exterior screen area set in advance.

The processor may calculate a caution level using the driving environment information and extract information to be displayed in the interior screen area and the exterior screen area in consideration of a probability of collision with an exterior object according to the caution level.

The processor may control driving circumstance information to be displayed in the interior screen area and a notification message to be displayed in the exterior screen area in consideration of the caution level.

The processor may reverse a text message which is displayed in the exterior screen area and display the reversed text message in a part of the interior screen area.

The processor may display an image of vehicle direction information in both the interior screen area and the exterior screen area.

The processor may display an exterior object image in the interior screen area and display at least one of approach direction information of the exterior object, approach speed information of the exterior object, and distance information of the exterior object in the interior screen area.

When the caution level is raised, the processor may expand an area of the exterior object image displayed in the interior screen area and display a guide message for the exterior object in the exterior screen area.

When the caution level is raised, the processor may display the exterior object image in the entire interior screen area and display a warning phrase to be overlaid on the exterior object image.

According to another aspect of the present invention, there is provided a method of displaying display information according to a driving environment, the method including (a) recognizing a driving environment, (b) performing display control for screens inside and outside a vehicle according to a result of recognizing the driving environment, and (c) performing display control for the screens inside and outside the vehicle according a change of a caution level.

Operation (a) may include calculating the caution level using travel speed, map data, and external object recognition information.

Operation (b) may include extracting information to be displayed in an interior screen area and an exterior screen area according to the caution level and controlling driving circumstance information to be displayed in the interior screen area and a notification message to be displayed in the exterior screen area.

Operation (b) may include reversing a text message which is displayed in the exterior screen area and displaying the reversed text message in a part of the interior screen area.

Operation (b) may include displaying an image of vehicle direction information in both the interior screen area and the exterior screen area.

Operation (b) may include displaying an external object image in the interior screen area and displaying at least one of approach direction information of the external object, approach speed information of the external object, and distance information of the external object in the interior screen area.

Operation (c) may include, when the caution level is raised, expanding an area of the external object image displayed in the interior screen area and displaying a guide message for the external object in the exterior screen area.

Operation (c) may include, when the caution level is further raised, displaying the external object image in the entire interior screen area and displaying a warning phrase to be overlaid on the external object image.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 3 shows an operation scenario according to an exemplary embodiment of the present invention;

FIG. 4 shows an information change between manual driving and autonomous driving according to an exemplary embodiment of the present invention;

FIG. 6 shows a change of vehicle platooning information according to an exemplary embodiment of the present invention;

FIG. 8 shows an information change in a specific environment and region (tunnel passage) according to an exemplary embodiment of the present invention;

FIG. 9 shows an icon and an image displayed in an interior screen area and an exterior screen area according to another exemplary embodiment of the present invention;

FIG. 12 shows information displayed in an interior screen area and an exterior screen area at caution level 2 (reduced speed, slow driving) according to another exemplary embodiment of the present invention;

DETAILED DESCRIPTION OF THE INVENTION

The above-described objects of the present invention, other objects, advantages, features, and methods of achieving them will become apparent from exemplary embodiments described in detail with reference to the accompanying drawings.

However, the present invention is not limited to the embodiments disclosed below and may be implemented in various different forms. The embodiments are provided only to readily convey objects, configurations, and effects of the present invention to those skilled in the technical field to which the present invention pertains. The scope of the present invention is defined by the claims.

Terminology used in this specification is for the purpose of describing embodiments and is not intended to limit the present invention. Unless the context clearly indicates otherwise, the singular forms include the plural forms as well. The terms "comprises" and/or "comprising," when used herein, specify the presence of stated elements, steps, operations, and/or devices and do not preclude the presence or addition of one or more other elements, steps, operations, and/or devices.

Figure 1:
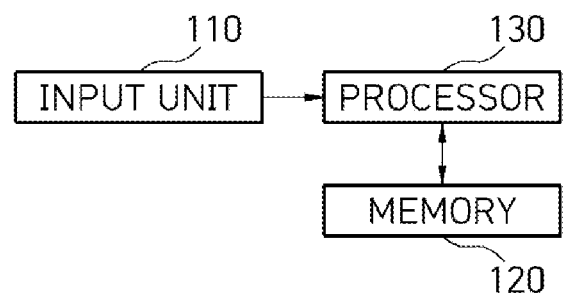
FIG. 1 is a block diagram of an apparatus for displaying vehicle information according to an exemplary embodiment of the present invention.

FIG. 1 is a block diagram of an apparatus or system for displaying vehicle information according to an exemplary embodiment of the present invention.

The apparatus for displaying vehicle information according to the present invention includes an input unit 110 which receives driving environment information indicative of a driving environment around the first vehicle, a memory 120 in which a program for controlling displays inside and outside a vehicle according to a driving environment is stored, and a processor 130 which executes the program. The processor 130 controls at least one of the interior and exterior displays to selectively project an image showing information in consideration of the driving environment information by transmitting a control command signal for the at least one of the interior and exterior displays.

The processor 130 controls both the interior and exterior displays of the vehicle to be used through a short-focus projector and a windshield equipped with a variable transmission film.

The processor 130 determines whether to use the displays inside and outside the vehicle using the driving environment information.

The processor 130 controls the interior display to display driving-related information in a manual driving mode and controls the exterior display to display communication information for another vehicle or a pedestrian in an autonomous driving mode by using driving mode information.

The processor 130 controls the exterior display to display information extracted from reservation information in consideration of security before a user gets in or has occupied the vehicle and controls the interior display to display driving-related information after the user gets in the vehicle by using the reservation information and boarding information of a shared car.

Using vehicle platooning situation information, the processor 130 controls an exterior display of a leading vehicle of a vehicle platoon to display information related to vehicle platooning and controls interior displays of other vehicles to display at least one of destination information and entertainment information. The vehicle platoon may include a plurality of vehicles travelling together as a group.

When a vehicle deviates from the vehicle platooning, the processor 130 controls the exterior display of the leading vehicle of the vehicle platoon to display changed information related to the vehicle platooning and controls the interior display of the deviating vehicle to display driving-related information.

The processor 130 controls the interior display to display an image of a school zone warning, a speed limit for a school zone when the vehicle enters a school zone and controls the exterior display to display a pedestrian crossing guidance message when a child who tries to cross is detected in the travel direction of the vehicle.

When the vehicle enters and then exits a tunnel, the processor 130 controls the exterior display to display an image showing a travel speed of the vehicle, a speed limit for the tunnel, or turn indicator information.

Figure 2:
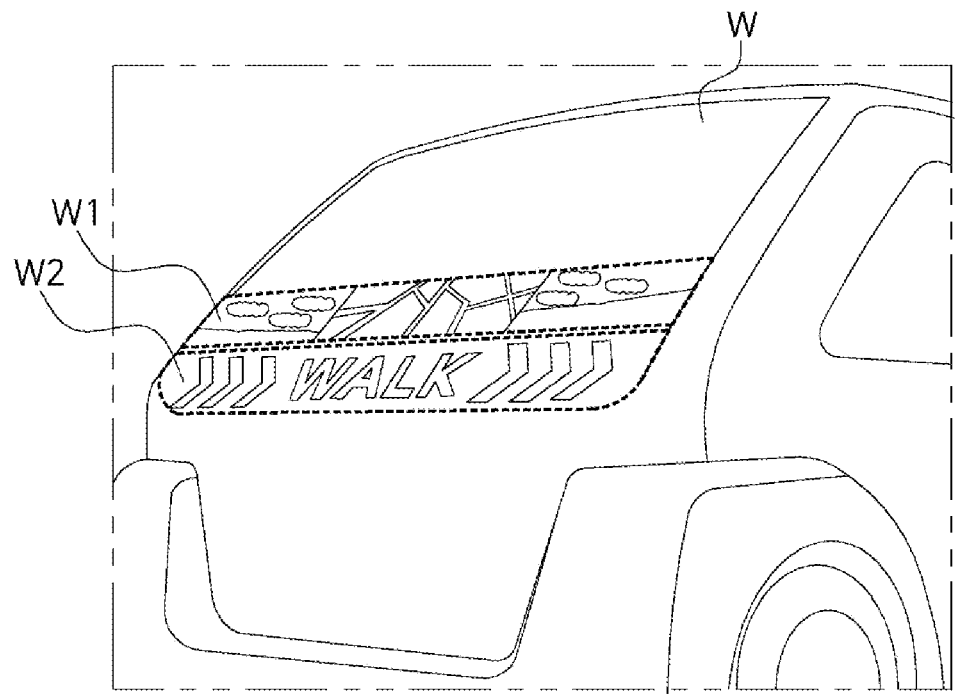
FIG. 2 shows an exterior screen area and an interior screen area of a vehicle windshield according to an exemplary embodiment of the present invention.

FIG. 2 shows an exterior screen area and an interior screen area of a vehicle windshield according to an exemplary embodiment of the present invention.

A vehicle windshield W includes an interior screen area W1 and an exterior screen area W2.

A short-focus projector is disposed on a roof or close to a cockpit. The short-focus projector provides driving information to a driver through concentration adjustment of an electrochromic film and is used as a communication lamp for exterior communication.

The windshield includes windshield glass, suspended particle device (SPD) film, and polymer dispersed liquid crystal (PDLC) film.

The interior screen area W1 is defined as a display area for providing information to a vehicle passenger, and the exterior screen area W2 is defined as a display area for providing information to objects (drivers of other vehicles, pedestrians, etc.) outside the vehicle.

As described above, the interior screen area W1 is intended for interior display. The interior screen area W1 does not expose an interior image to the outside for the purpose of privacy protection and is made of an electrochromic film which becomes transparent as necessary so that the driver may check surroundings of the vehicle.

When the projector is turned on, the interior screen area W1 remains opaque and is used for displaying a screen of the projector.

As described above, the exterior screen area W2 is intended for exterior communication. The exterior screen area W2 is made of an electrochromic film and may externally display something that is projected.

The electrochromic film may be applied (attached) to a partial area or the entire area of the windshield W and used as a display.

The projector projects projector beams including exterior display information onto the exterior screen area W2 of the windshield W. When the distance from the exterior screen area W2 is short, the projector is a short-focus projector.

As described above, external display information which is displayed by the exterior screen area W2 may be information representing that a person who is walking outside the vehicle may cross (e.g., the text "WALK" shown in FIG. 2), and such external display information may be in the form of an icon, text, or a combination thereof.

In addition to the display through the exterior screen area W2, the guide message "You may cross" may be provided through a voice signal.

FIG. 3 shows an operation scenario according to an exemplary embodiment of the present invention.

According to the exemplary embodiment of the present invention, a short-focus projector and a variable transmission film windshield are used to display vehicle information. Also, as shown in FIG. 3, driving information provided to a vehicle driver in a vehicle is displayed in the upper side, and driving information provided to drivers of other vehicles or pedestrians is displayed in the lower side.

Both internal and external display information is displayed using the short-focus projector, and the interior and exterior displays may be changed according to circumstances.

FIG. 4 shows an information change between manual driving and autonomous driving according to an exemplary embodiment of the present invention.

During manual driving, basic cluster information (revolutions per minute (RPM), travel speed, gear information, etc.), navigation information, and vehicle function information (e.g., an air conditioning function) are displayed through an interior display.

When a driving mode is changed to autonomous driving, a message for communication with pedestrians or other vehicles is displayed through an exterior display. For example, as shown in FIG. 4, the message ">>>WALK>>>" is displayed through the exterior display, that is, a message representing that pedestrians may cross is displayed.

Figure 5:
FIG. 5 shows an information change of a shared car according to an exemplary embodiment of the present invention.

FIG. 5 shows an information change of a shared car according to an exemplary embodiment of the present invention.

Before a reserving passenger gets in a shared car, the reserving passenger is displayed through an exterior display, and route information to be recognized by the passenger is displayed.

For example, as shown in FIG. 5, when a destination of the reserving passenger (XX Choi) is OOO Gangnam-Gu, the message "CHOI to Gangnam sta" is displayed.

Here, the message is displayed through a countermeasure such as not displaying the whole name of the reserving passenger, displaying the last four digits (e.g., 4396) in the case of displaying a phone number, and displaying the destination only in terms of Gu.

When the reserving passenger gets in the car, driving-related information of the reserving passenger is displayed through an interior display such as displaying a navigation route or the like and providing a notification of a passenger who will get in the car next.

FIG. 6 shows a change of vehicle platooning information according to an exemplary embodiment of the present invention.

As shown in FIG. 6, a leading vehicle of a vehicle platoon displays a route and vehicle platooning situation information through the exterior display.

For example, the message "1st Platooning 7 vehicles" is displayed through the exterior display.

Vehicles of the vehicle platoon other than the leading one display destination information and the like through the interior displays.

Here, the vehicles of the vehicle platoon other than the leading one display entertainment information through the interior displays and display minimized driving-related information (e.g., only displaying speed information or only displaying remaining time information to the destination).

When the third vehicle of the vehicle platoon deviates from the platoon, the leading vehicle of the vehicle platoon displays current platoon information through the exterior display, that is, the message "1st Platooning 6 vehicles" is displayed through the exterior display according to the above example.

The vehicle deviating from the vehicle platoon displays basic cluster information (RPM, speed information, etc.), navigation information, map information, etc. through the interior display.

Figure 7:
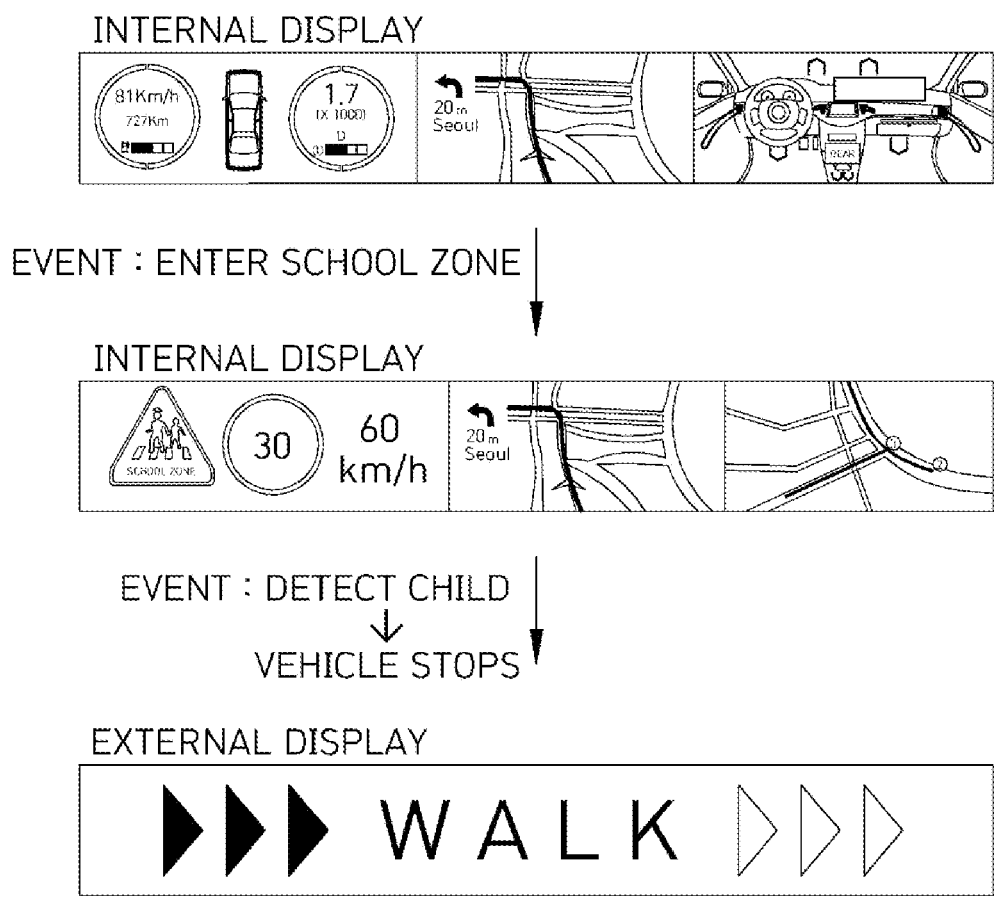
FIG. 7 shows an information change in a specific environment and region (school zone) according to an exemplary embodiment of the present invention.

FIG. 7 shows an information change in a specific environment and region (school zone) according to an exemplary embodiment of the present invention.

Basic cluster information (RPM, travel speed, gear information, etc.), navigation information, and vehicle function information (e.g., an air conditioning function) is displayed through an interior display.

When a currently running vehicle enters a school zone, information on the school zone (an icon, speed limit information, etc.) is displayed through the interior display.

When a child who tries to cross is detected in the travel direction of the vehicle, the interior display is switched to an exterior display, and the message ">>>WALK>>>" or the like is displayed through the exterior display.

Here, information indicating a direction for crossing according to the current location of the child who tries to cross may be included in the message displayed through the exterior display.

Also, information indicating that a child is crossing may be shared through a rear display or a side display.

FIG. 8 shows an information change in a specific environment and region (passing through a tunnel, night environment) according to an exemplary embodiment of the present invention.

Basic cluster information (RPM, travel speed, gear information, etc.), navigation information, and vehicle function information (e.g., an air conditioning function) are displayed through an interior display.

When it is determined that the location of a currently traveling vehicle is in a tunnel, the interior display is switched to an exterior display, and travel speed information or speed limit information is displayed. Also, travel direction information (turn indicator information) is displayed through the exterior display.

A method of displaying vehicle information according to the present invention includes operation (a) of recognizing a driving environment and operation (b) of determining whether to display screens inside and outside a vehicle according to a result of recognizing the driving environment and performing display control.

In operation (b), selected display information is projected using a short-focus projector and a windshield to which a variable transmission film is applied.

In operation (b), an interior display is controlled to display driving-related information in a manual driving mode, and an exterior display is controlled to display communication information for other vehicles or pedestrians in an autonomous driving mode by using driving mode information.

In operation (b), an exterior display is controlled to display information extracted from reservation information in consideration of security before a user gets in the vehicle, and an interior display is controlled to display driving-related information after the user gets in the vehicle by using the reservation information and boarding information of a shared car.

In operation (b), a leading vehicle of a vehicle platoon controls an exterior display to display information related to vehicle platooning, and other vehicles control interior displays to display at least one of destination information and entertainment information by using vehicle platooning situation information.

In operation (b), when a vehicle deviates from the vehicle platooning, the leading vehicle of the vehicle platoon controls the exterior display to display changed information related to the vehicle platooning, and the deviating vehicle controls the interior display to display driving-related information.

In operation (b), an interior display is controlled to display an image of entering a school zone and speed limit information when the vehicle enters a school zone, and an exterior display is controlled to display a crossing-related guide message when a child who tries to cross is detected in the travel direction of the vehicle.

In operation (b), when the vehicle enters and then exits a tunnel, an exterior display is controlled to display travel speed information or speed limit information and turn indicator information.

An apparatus for displaying display information according to a driving environment includes an input unit which receives driving environment information, a memory in which a program for controlling displays inside and outside a vehicle according to a driving environment is stored, and a processor which executes the program. The processor controls display information according to the driving environment information to be selectively projected onto an interior screen area and an exterior screen area which are set in advance.

The processor calculates a caution level using the driving environment information and extracts information to be displayed in the interior screen area and the exterior screen area in consideration of a probability of collision with an exterior object according to the caution level.

The processor controls driving circumstance information to be displayed in the interior screen area and a notification message to be displayed in the exterior screen area in consideration of the caution level.

The processor reverses a text message which is displayed in the exterior screen area and displays the reversed text message in a part of the interior screen area.

The processor displays an image of vehicle direction information in both the interior screen area and the exterior screen area.

The processor displays an external object image in the interior screen area and displays at least one of approach direction information of the external object, approach speed information of the external object, and distance information of the external object in the interior screen area.

When the caution level is raised, the processor expands an area of the external object image displayed in the interior screen area and displays a guide message for the external object in the exterior screen area.

When the caution level is raised, the processor displays the external object image in the entire interior screen area and displays a warning phrase to be overlaid on the external object image.

FIG. 9 shows an icon and an image displayed in an interior screen area and an exterior screen area according to another exemplary embodiment of the present invention.

An interior screen area W1 includes a cluster area, an application area (a navigation application and the like), and a vehicle function area (air conditioner information and the like).

Usually, driving-related information is projected onto the interior screen area W1, and nothing is projected onto an exterior screen area W2.

When the vehicle turns left, the icon "<<<<" regarding the vehicle's travel direction is projected onto the interior screen area W1 and the exterior screen area W2 such that the same image is displayed in parts of the exterior screen area W2 and the interior screen area W1.

Pedestrians may recognize the travel direction of the running vehicle through the image displayed through the exterior screen area W2 and avoid collision.

Figure 10:
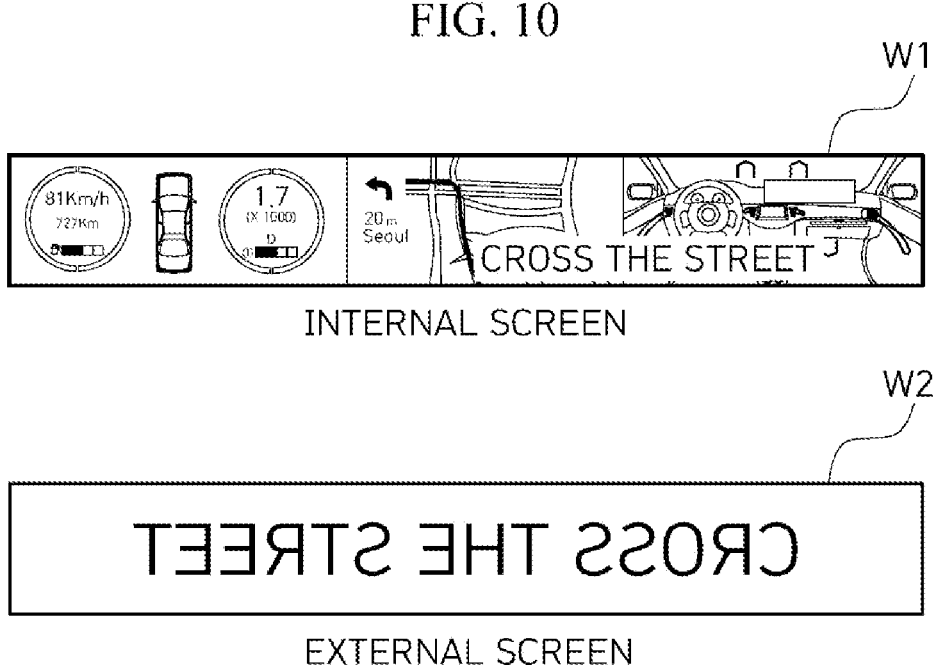
FIG. 10 shows text displayed in an interior screen area and an exterior screen area according to another exemplary embodiment of the present invention.

FIG. 10 shows text displayed in an interior screen area and an exterior screen area according to another exemplary embodiment of the present invention.

It is assumed that a running vehicle stops at a crosswalk without crosswalk traffic lights.

When it is determined that a pedestrian is waiting for crossing according to acquired surrounding information, the vehicle transmits a message indicating that pedestrians may cross.

When the vehicle is in autonomous driving, the vehicle automatically performs a command to display (project) the guide phrase "CROSS THE STREET." On the other hand, when the driver is manually driving the vehicle, the vehicle performs the command to display (project) the guide phrase "CROSS THE STREET" according to a button input, a voice input, a gesture input, or the like.

The vehicle displays the text "CROSS THE STREET" in a part of the interior screen area W1 and displays (projects) text obtained by reversing the text in the exterior screen area W2.

Accordingly, the pedestrian outside the vehicle sees the text "CROSS THE STREET," considers that the vehicle will remain stopped, and crosses the crosswalk.

In this case, the vehicle displays text indicating that a pedestrian is crossing on the rear side thereof to notify another vehicle, which is waiting behind, that a pedestrian is crossing.

Figure 11:
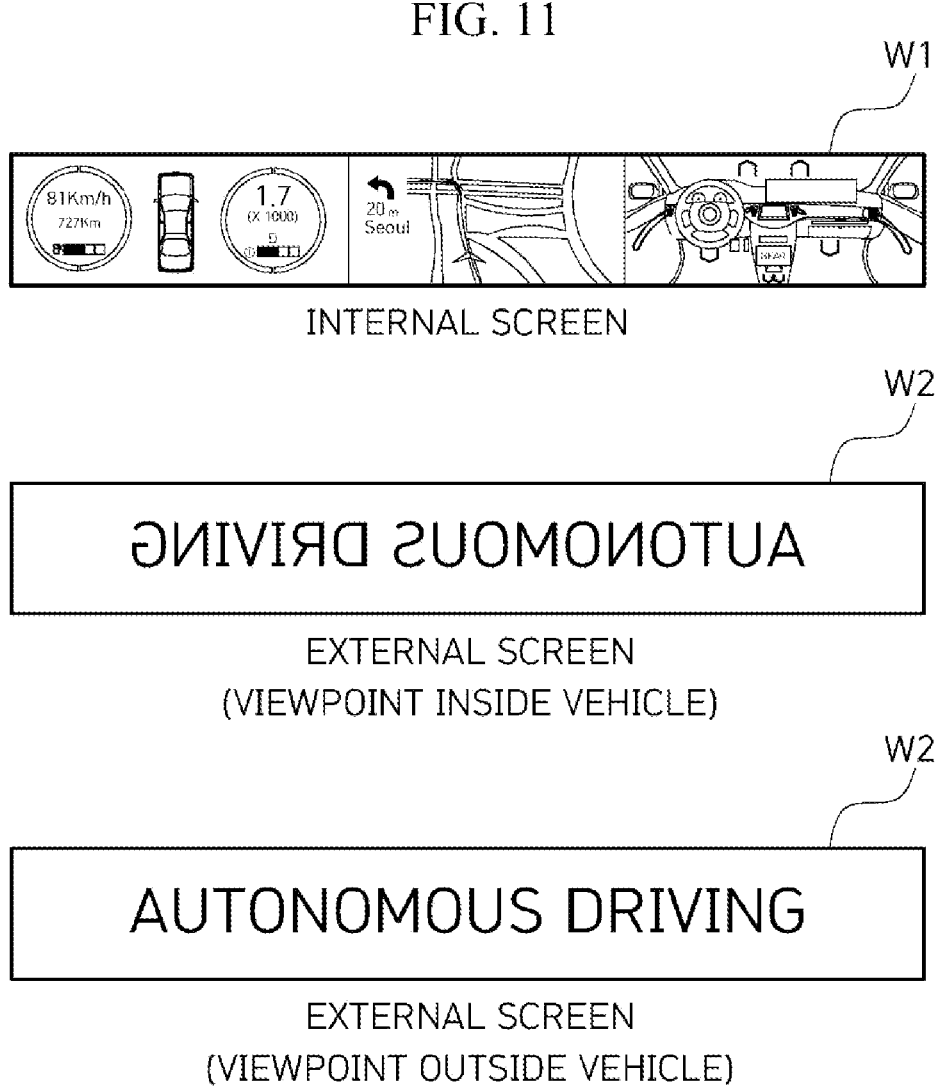
FIG. 11 shows information displayed in an interior screen area and an exterior screen area at caution level 1 (general driving) according to another exemplary embodiment of the present invention.

FIG. 11 shows information displayed in an interior screen area and an exterior screen area at caution level 1 (general driving) according to another exemplary embodiment of the present invention.

According to the exemplary embodiment of the present invention, information to be displayed in an interior screen area W1 and an exterior screen area W2 is selected according to a caution level and displayed.

To aid in understanding by those of ordinary skill in the art, an exemplary embodiment of display will be described below according to caution level 1 (general driving), caution level 2 (reduced speed, travel at low speed), caution level 3 (stop, low speed, approach of a pedestrian), and caution level 4 (close approach of a pedestrian).

Referring to FIG. 11, during general driving, such as high-speed driving, a caution level is relatively low (level 1), and thus cluster information, navigation information, and vehicle function information (e.g., an air conditioning function) are displayed in the interior screen area W1.

In the exterior screen area W2, nothing is projected, or vehicle travel information (during autonomous driving) is displayed as shown in FIG. 11.

FIG. 11 shows the exterior screen area W2 seen from the viewpoint of the inside of the vehicle and the exterior screen area W2 seen from the viewpoint of the outside of the vehicle together.

FIG. 12 shows information displayed in an interior screen area and an exterior screen area at caution level 2 (reduced speed, slow driving) according to another exemplary embodiment of the present invention.

When a road on which a vehicle is currently running is recognized as a low-speed section or a narrow road through driving environment recognition, a caution level is raised to 2.

The driving environment recognition may be performed in various ways such as vehicle-to-everything (V2X), ultra-wideband (UWB), a camera, and light detection and ranging (LiDAR).

In an interior screen area W1, external image information acquired through the camera is output so that information on pedestrians and obstacles is displayed.

Also, in the interior screen area W1, a warning message (caution for approach) is displayed regarding the approach of pedestrians and obstacles. Here, the warning message against such approaches may include an approach direction, an approach speed, a distance, and the like.

In an exterior screen area W2, vehicle travel information is displayed. For example, information indicating that the vehicle is in autonomous driving is displayed.

In the exterior screen area W2, a travel speed and route information (going forward, left turn, or right turn) of the currently running vehicle is displayed so that pedestrians or the drivers of other vehicles may intuitively recognize movement information of the running vehicle.

Figure 13:
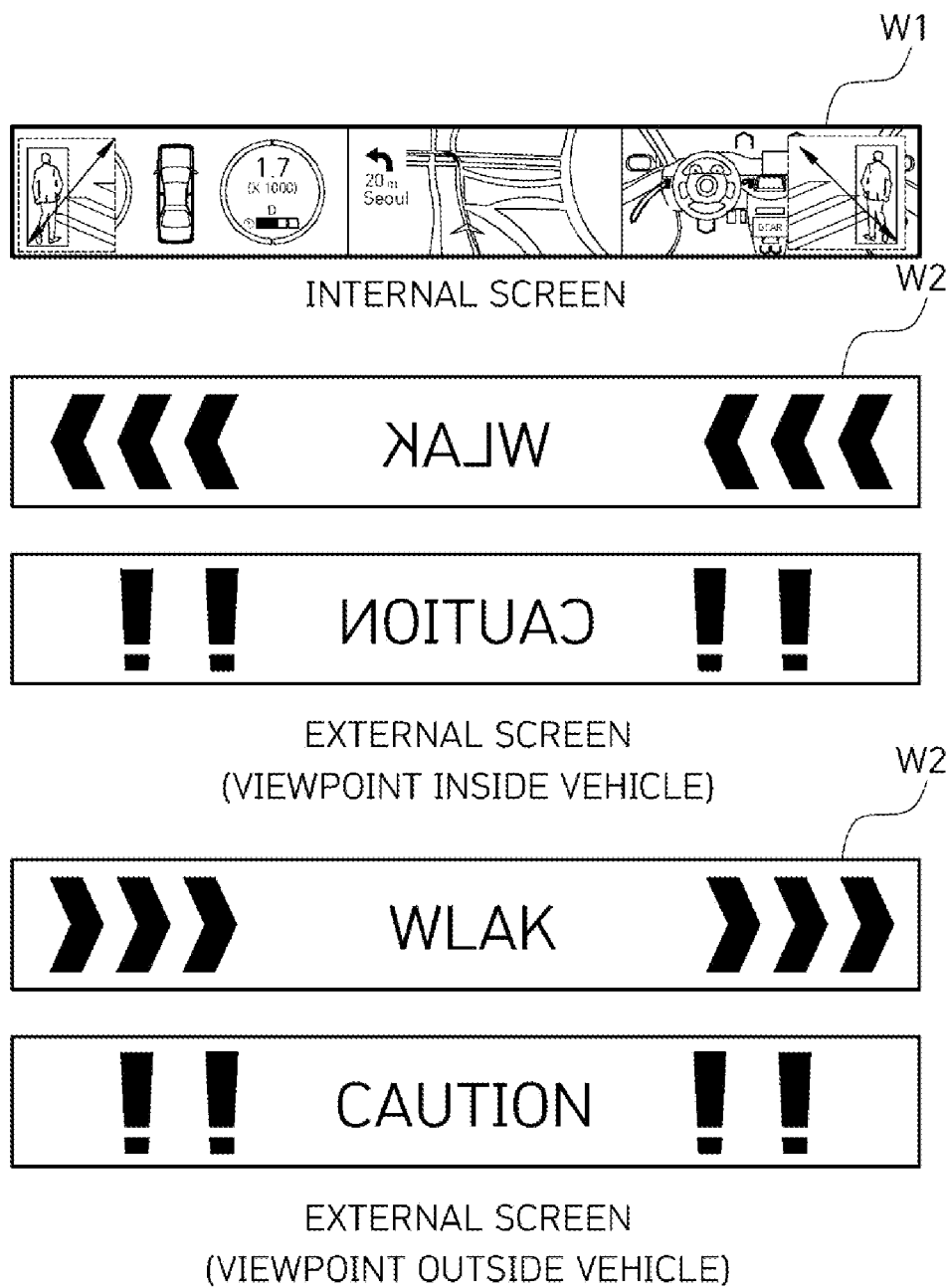
FIG. 13 shows information displayed in an interior screen area and an exterior screen area at caution level 3 (stop, low speed, approach of a pedestrian) according to another exemplary embodiment of the present invention.

FIG. 13 shows information displayed in an interior screen area and an exterior screen area at caution level 3 (stop, low speed, approach of a pedestrian) according to another exemplary embodiment of the present invention.

When it is recognized that a vehicle is in an area with a high probability of collision, such as approaching a crosswalk or an area where ambient noise is a preset decibel or higher, a caution level is raised.

Accordingly, a screen area for displaying external information becomes relatively large in an interior screen area W1.

Also, when an electrochromic film becomes opaque for projection onto the interior screen area W1, it is difficult to see an external object transmitted through the opaque area. Therefore, control is performed on the basis of gaze information of the driver so that an interior screen area matched to an area in which a pedestrian or an obstacle is present becomes transparent.

According to driving environment information, for example, when a pedestrian is waiting to cross at a crosswalk, an exterior screen area W2 provides a guide message by displaying the message "WALK" such that the pedestrian crosses.

Also, in an area, such as an alleyway with pedestrians and vehicles, the message "Caution" is displayed to aid surrounding pedestrians in recognizing the presence of the vehicle.

Figure 14:
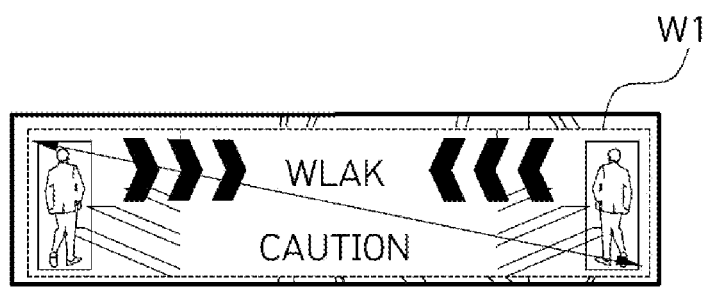
FIG. 14 shows information displayed in an interior screen area at caution level 4 (close approach of a pedestrian) according to another exemplary embodiment of the present invention.

FIG. 14 shows information displayed in an interior screen area at caution level 4 (close approach of a pedestrian) according to another exemplary embodiment of the present invention.

When it is determined that it is highly likely to collide with a pedestrian because the pedestrian has come within a preset distance from a vehicle, the caution level is raised.

In this case, an interior screen area W1 may be enlarged to a preset area.

Alternatively, a pedestrian video may be displayed in the entire interior screen area W1, and a warning phrase may be displayed to be overlaid on the pedestrian video.

Accordingly, the driver may intuitively recognize the locations and movement of the pedestrian and an obstacle and may become aware that the probability of collision is high.

At the same time, a vocal warning message is also transmitted. In other words, a caution message is provided to the driver, and a horn or a voice message is transmitted to the pedestrian such that collision may be avoided.

Figure 15:
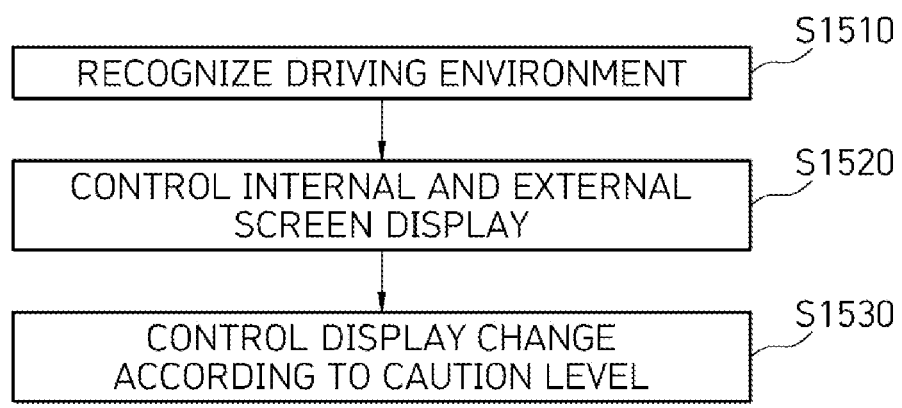
FIG. 15 is a flowchart illustrating a method of displaying display information depending on a driving environment according to another exemplary embodiment of the present invention.

FIG. 15 is a flowchart illustrating a method of displaying display information depending on a driving environment according to another exemplary embodiment of the present invention.

The method of displaying display information depending on a driving environment according to the other exemplary embodiment of the present invention includes an operation S1510 of recognizing a driving environment, an operation S1520 of performing display control for screens inside and outside a vehicle according to a result of recognizing the driving environment, and an operation S1530 of performing display control for the screens inside and outside the vehicle according to a change of a caution level.

In the operation S1510, a caution level is calculated using travel speed, map data, and external object recognition information.

In the operation S1520, information to be displayed in an interior screen area and an exterior screen area is extracted according to the caution level, and control is performed to display driving circumstance information in the interior screen area and to display a notification message in the exterior screen area.

In the operation S1520, a text message which is displayed in the exterior screen area is reversed and displayed in a part of the interior screen area.

In the operation S1520, an image of vehicle direction information is displayed in both the interior screen area and the exterior screen area.

In the operation S1520, an external object image is displayed in the interior screen area, and at least one of approach direction information of the external object, approach speed information of the external object, and distance information of the external object is displayed in the interior screen area.

In the operation S1530, when the caution level is raised, an area of the external object image displayed in the interior screen area is expanded, and a guide message for the external object is displayed in the exterior screen area.

In the operation S1530, when the caution level is further raised, the external object image is displayed in the entire interior screen area, and a warning phrase is displayed to be overlaid on the external object image.

According to the present invention, a single short-focus projector is used to control interior and exterior displays, and thus the cost is reduced compared to the case of using separate displays. Also, the interior and exterior displays are automatically changed on the basis of a driving circumstance so that safety and efficiency are improved.

Display information provided to a passenger of a vehicle and display information provided to pedestrians outside the vehicle are controlled and managed according to a driving environment. Accordingly, a driver is enabled to readily recognize the presence of pedestrians and obstacles and avoid collision, and pedestrians are enabled to intuitively recognize movement of the vehicle and avoid collision. Consequently, driving safety is improved.

Effects of the present invention are not limited to those described above, and other effects which have not been described may be clearly understood by those of ordinary skill in the art from the above descriptions.

The method of displaying vehicle information according to the exemplary embodiment of the present invention may be implemented in a computer system or recorded on a recording medium. The computer system may include at least one processor, a memory, a user input device, a data communication bus, a user output device, and a storage. Each of the above-described elements performs data communication through the data communication bus.

The computer system may further include a network interface coupled to a network. The processor may be a central processing unit (CPU) or a semiconductor device which processes instructions stored in the memory and/or the storage.

The memory and the storage may include various forms of volatile or non-volatile storage media. For example, the memory may include a read only memory (ROM) and a random access memory (RAM).

Therefore, the method of displaying vehicle information according to the exemplary embodiment of the present invention may be implemented in a computer-executable method. The method of displaying vehicle information according to the exemplary embodiment of the present invention may be performed by a computer device using computer-readable instructions.

The above-described method of displaying vehicle information according to the exemplary embodiment of the present invention may be implemented as computer-readable code on a computer-readable recording medium. The computer-readable recording medium includes any kind of recording media for storing data which may be read by a computer system. Examples of the computer-readable recording medium may include a ROM, a RAM, magnetic tape, a magnetic disk, a flash memory, an optical data storage device, and the like. The computer-readable recording medium may also be distributed over computer systems connected through a computer communication network so that the computer-readable code may be stored and executed in a distributed manner.

What is claimed is:

1. A system for controlling a plurality of displays of a vehicle, the system comprising:
   an input unit configured to receive driving environment information indicative of a driving environment around a first vehicle, the first vehicle comprising a plurality of displays including an interior display and an exterior display;
   a processor;
   a computer-readable medium in communication with the processor and storing instructions that, when executed by the processor, cause the processor to control the system to perform:
      selecting, based on the received driving environment information, at least one of the interior and exterior displays of the first vehicle for displaying an image; and
      controlling the selected at least one of the interior and exterior displays to display the image,
   wherein the instructions, when executed by the processor, further cause the processor to control the system to perform:
      determining whether a driver has occupied the first vehicle;
      in response to determining that the driver has not occupied the first vehicle, controlling the exterior display to display a first image showing vehicle reservation information; and
      in response to determining that the driver has occupied the vehicle, controlling the interior display to display a second image showing driving-related information,
   wherein the first vehicle is one of a vehicle platoon comprising a plurality of vehicles travelling together as a group, the plurality of vehicles including a leader vehicle, and each vehicle of the vehicle platoon includes interior and exterior displays, and
   wherein the instructions, when executed by the processor, further cause the processor to control the system to perform:
      determining whether the first vehicle is the leading vehicle of the vehicle platoon;
      in response to determining that the first vehicle is the leading vehicle of the vehicle platoon, controlling the exterior display to display a first image showing vehicle platoon information; and
      in response to determining that the first vehicle is not the leading vehicle of the vehicle platoon, controlling the interior display to display a second image showing destination information or entertainment information.

2. The system of claim 1, the interior and exterior displays comprises:
   a short-focus projector; and
   a variable transmission film installed on a windshield of the vehicle.

3. The system of claim 1, wherein the instructions, when executed by the processor, further cause the processor to control the system to perform:
   determining a driving mode of the first vehicle, the driving mode including a manual driving mode and an autonomous driving mode;
   in response to determining that the first vehicle is operating in the manual driving mode, controlling the interior display to display a first image showing driving-related information; and
   in response to determining that the first vehicle is operating in the autonomous driving mode, controlling the exterior display to display a second image showing communication information for another vehicle or a pedestrian.

4. The system of claim 1, wherein:
   the plurality of vehicles of the vehicle platoon includes a second vehicle that is not the leading vehicle of the vehicle platoon, and
   the instructions, when executed by the processor, further cause the processor to control the system to perform:
      detecting that the second vehicle deviates from the vehicle platoon; and
      in response to detecting that the first vehicle is the leading vehicle of the vehicle platoon, performing:

updating the vehicle platoon information; and
controlling the exterior display to display a third image showing the updated vehicle platoon information.

5. The system of claim 1, wherein the instructions, when executed by the processor, further cause the processor to control the system to perform:
detecting that the first vehicle is entering a school zone;
controlling the interior display to display a first image showing a school zone warning or a speed limit for the school zone; and
controlling the exterior display to display a second image showing a pedestrian crossing guidance message.

6. The system of claim 1, wherein the instructions, when executed by the processor, further cause the processor to control the system to perform:
detecting that the first vehicle enters a tunnel;
controlling the exterior display to display an image showing a travel speed of the first vehicle, a speed limit for the tunnel, or turn indicator information.

7. A method of operating a system for controlling a plurality of displays of a vehicle, comprising:
receiving driving environment information indicative of a driving environment around a first vehicle, the first vehicle comprising a plurality of displays including an interior display and an exterior display;
selecting, based on the received driving environment information, at least one of the interior and exterior displays of the first vehicle for displaying an image; and
controlling the selected at least one of the interior and exterior displays to display the image,
wherein the first vehicle is one of a vehicle platoon comprising a plurality of vehicles travelling together as a group, the plurality of vehicles including a leader vehicle, each vehicle of the vehicle platoon including interior and exterior displays, and
wherein the method further comprises:
determining whether the first vehicle is the leading vehicle of the vehicle platoon;
in response to determining that the first vehicle is the leading vehicle of the vehicle platoon, controlling the exterior display to display a first image showing vehicle platoon information; and
in response to determining that the first vehicle is not the leading vehicle of the vehicle platoon, controlling the interior display to display a second image showing destination information or entertainment information.

8. The method of claim 7, further comprising:
determining a driving mode of the first vehicle, the driving mode including a manual driving mode and an autonomous driving mode;
in response to determining that the first vehicle is operating in the manual driving mode, controlling the interior display to display a first image showing driving-related information; and
in response to determining that the first vehicle is operating in the autonomous driving mode, controlling the exterior display to display a second image showing communication information for another vehicle or a pedestrian.

9. The method of claim 7, further comprising:
determining whether a driver has occupied the first vehicle;
in response to determining that the driver has not occupied the first vehicle, controlling the exterior display to display a first image showing vehicle reservation information; and
in response to determining that the driver has occupied the vehicle, controlling the interior display to display a second image showing driving-related information.

10. The method of claim 7, wherein:
the plurality of vehicles of the vehicle platoon includes a second vehicle that is not the leading vehicle of the vehicle platoon, and
the method further comprises:
detecting that the second vehicle deviates from the vehicle platoon; and
in response to detecting that the first vehicle is the leading vehicle of the vehicle platoon, performing:
updating the vehicle platoon information; and
controlling the exterior display to display a third image showing the updated vehicle platoon information.

11. The method of claim 7, further comprising:
detecting that the first vehicle is entering a school zone;
controlling the interior display to display a first image showing a school zone warning or a speed limit for the school zone; and
controlling the exterior display to display a second image showing a pedestrian crossing guidance message.

12. The method of claim 7, further comprising:
detecting that the first vehicle enters a tunnel;
controlling the exterior display to display an image showing a travel speed of the first vehicle, a speed limit for the tunnel, or turn indicator information.

13. A non-transitory computer-readable medium comprising instructions that, when executed by a processor, cause the processor to control a system to perform functions for controlling a plurality of displays of a vehicle, the functions including:
receiving driving environment information indicative of a driving environment around a first vehicle, the first vehicle comprising a plurality of displays including an interior display and an exterior display;
selecting, based on the received driving environment information, at least one of the interior and exterior displays of the first vehicle for displaying an image; and
controlling the selected at least one of the interior and exterior displays to display the image,
wherein the first vehicle is one of a vehicle platoon comprising a plurality of vehicles travelling together as a group, the plurality of vehicles including a leader vehicle, each vehicle of the vehicle platoon including interior and exterior displays, and
wherein the functions further include:
determining whether the first vehicle is the leading vehicle of the vehicle platoon;
in response to determining that the first vehicle is the leading vehicle of the vehicle platoon, controlling the exterior display to display a first image showing vehicle platoon information; and
in response to determining that the first vehicle is not the leading vehicle of the vehicle platoon, controlling the interior display to display a second image showing destination information or entertainment information.

\* \* \* \* \*